May 27, 1924.  1,495,854
A. A. LEHR
PROFILING PATTERN
Filed Aug. 31, 1922
Fig.1.
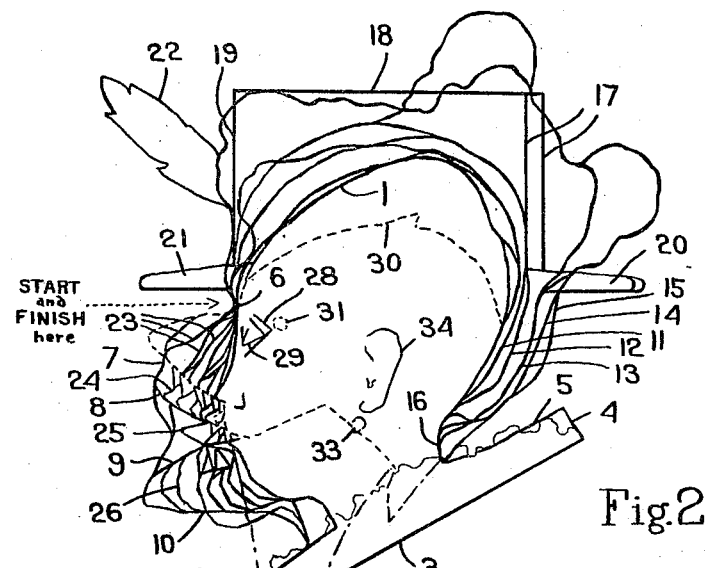
Fig.2.
Fig.3.
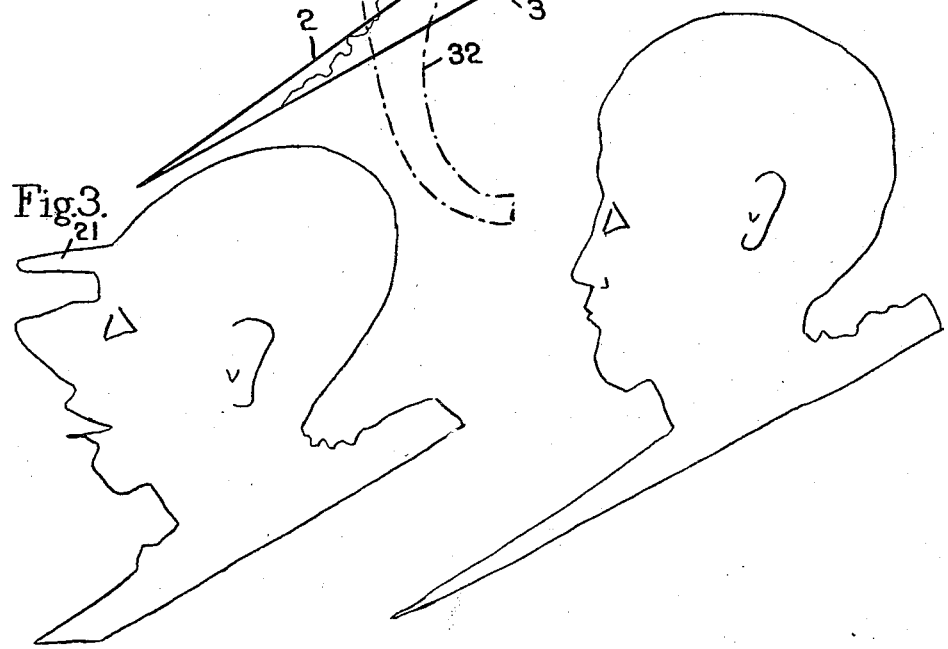
Inventor.
Anton A. Lehr
by Heard Smith & Tennant.
Attys Patented May 27, 1924.

1,495,854

UNITED STATES PATENT OFFICE.

ANTON A. LEHR, OF BELMONT, MASSACHUSETTS.

PROFILING PATTERN.

Application filed August 31, 1922. Serial No. 585,528.

*To all whom it may concern:*

Be it known that I, ANTON A. LEHR, a citizen of the United States, and resident of Belmont, county of Middlesex, State of Massachusetts, have invented an Improvement in Profiling Patterns, of which the following description, in connection with the accompanying drawing, is a specification, like characters on the drawing representing like parts.

This invention relates to improvements in amusement devices and the object thereof is to provide a profiling pattern adapted to be traced to represent the profiles of different objects. While the invention may be said to be primarily intended for an amusement device it is also designed with the view to providing a device which will be of educational value as the profiles which are adapted to be traced by following different lines of the pattern may be so designed as to represent generally the profiles of peoples of different races or of various natural objects so that a child by tracing the various profiles will not only derive amusement, but also will become familiar with the general type of features of different nationalities, races or objects.

A further object of the invention is to provide a tracing pattern of the class described which may be used by placing a translucent sheet over the pattern and tracing the same, or which may be used by placing the pattern over a sheet of paper with a sheet of carbon paper interposed therebetween and by tracing a selected profile of the pattern by means of a stylus to cause the profile to be produced upon the sheet.

More specifically the invention consists in providing a tracing pattern representing the profiles of various objects comprising a sheet of material provided with a plurality of continuous contour lines having a common source and common basic sections for certain portions of the profiles of the various objects to be traced, said pattern also preferably being provided with common lines representing the position of the eye relatively to the base of the forehead.

Other objects and features of the invention will more fully appear from the following description and the accompanying drawing and will be pointed out in the claims.

A preferred embodiment of the invention which is designed for an amusement device is illustrated in the accompanying drawing, in which, Fig. 1 is a view of the profiling pattern;

Fig. 2 is a view of the profile of a face produced by tracing a selected contour line of the pattern; and, Fig. 3 is a view of a grotesque figure also formed by tracing another selected contour line of said pattern.

The invention in its broad sense comprises a pattern composed of contour lines representing the profiles of different objects or faces, said lines being so located as to have a common starting and finishing point, and basic sections in common, so that by continuously tracing a selected contour line together with the whole or a portion of some or all of the common sections various different profiles may be produced.

The particular embodiment of the invention illustrated in the accompanying drawing may be described as comprising an inner contour line 1 representing the profile of a human head, face and neck merging into a conventional shoulder design consisting of substantially straight lines 2, 3, 4 and 5. Other contour lines are provided having a common source 6 preferably at the base of the forehead which constitute a starting and finishing point for tracing the contour line.

The tracing pattern also is provided with common basic sections including a nasal basic section 7 which defines the base of the nose of the different profiles. Another basic line 8 defines the contour of the upper lip of the several profiles. Another basic line 9 defines the lower lip of the profile and another common basic section 10 defines the lower edge of the chin of the various profiles and merges into a basic line representing the neck which in turn merges into the shoulder design.

Various contour lines 11, 12, 13, 14 and 15, which preferably merge into a common line 16 at the base of the back of the neck, are provided to define various contours of the back and crown of the head, arrangements of hair, etc., and merge into each other at the common source or starting and finishing point 6.

Other lines may be provided to represent different devices which are worn upon the head, such, for example, as a hat the crown of which is represented by lines 17, 18 and 19 and the rim of which is represented by lines 20 and 21, the line 21 also being adapted to be used to indicate the vizor of a cap as illustrated in Fig. 3. Another line 22 is shown as illustrating a leaf or ornament for the head or hat.

Various lines 23 extending from the source 6 may be provided to represent different types of noses, such lines merging into the common line 7 which defines the nasal base. Likewise various other lines 24 connecting the nasal base line to the upper lip base line may be provided and other lines 25 of various designs serve to connect the basic line 8 of the upper lip with the basic line 9 of the lower lip and various different lines 26 may be provided to connect the basic line of the lower lip with the basic line of the chin.

In using the pattern with a sheet of transparent tracing paper or cloth, the transparent paper or cloth is placed over the pattern and a selected contour line traced from the source along one of the lines 23 to the line 7 thence along the line 7 to a selected one of the lines 24 to the basic lip line 8, thence along the basic lip line toward the right to a selected line leading to the basic lower lip line 9, thence along one of the lines which represent the contour of the chin to the basic chin line 10, thence to the neck and shoulder line 2, then following the shoulder lines 2, 3, 4 and 5 to the base of the neck 16, and from this point along a selected line defining the contour of the head to the source 6.

The invention also includes certain angularly disposed lines 28 and 29 which are so located in respect to the source 6 or base of the forehead as properly to indicate the eye of the profile of the human face.

It will thus be seen that by following the various contour lines different facial profiles may be traced which may represent features of different races of peoples and also may represent very grotesque faces such as illustrated in Fig. 3.

The invention not only includes within its scope the representation of profiles of the human face, but also may include the profiles of animals or other objects. As illustrative of this broader scope of the invention the head of a dog is represented in a continuous dotted line 30 a portion of which dotted line is illustrated herein as forming the basic nasal line 7 of the human face adapted to be produced by following different contour lines. The eye of the dog is likewise represented as a dotted circle 31.

The head and trunk of an elephant are also capable of being produced by the pattern illustrated herein, the trunk being defined by dot and dash lines 32 and the head of the elephant by following certain of the contour lines heretofore described for the human head. In this instance the eye of the elephant is indicated by a broken circle 33 which is located slightly beneath the line 34 which indicates the common ear of the human head.

It will also be obvious that various other contour lines may be employed to represent different facial features or different objects within the scope of the invention and that the particular tracing pattern shown herein is of an illustrative character and is not restrictive of the scope of the invention defined in the following claims.

Having thus described my invention, what I claim as new, and desire to secure by Letters Patent, is:

1. A tracing pattern for representing the profiles of various objects comprising a sheet of material provided with a plurality of continuous contour lines having a common source and common basic sections for certain portions of the profiles of the objects to be traced.

2. A tracing pattern comprising a sheet of material provided with a plurality of continuous contour lines for various heads, said lines having a common source and common facial sections adapted to be traced selectively to represent different profiles.

3. A tracing pattern comprising a sheet of material provided with a plurality of continuous contour lines of various heads having in common sections defining the base of the nose and portions of the lips adapted to be traced selectively to represent different profiles.

4. A tracing pattern comprising a sheet of material provided with a plurality of continuous contour lines of various heads having a common source at the base of the forehead, a common section defining the base of the nose and common sections defining respectively portions of the upper and lower lips, chin and neck, adapted to be traced selectively to represent different profiles and common lines positioned to represent the eye of the figure traced.

5. A tracing pattern comprising a sheet of material provided with a plurality of continuous contour lines of various heads having a common source at the base of the forehead, a common section defining the base of the nose and common sections defining respectively portions of the upper and lower lips, the neck and shoulders, adapted to be traced selectively to represent different profiles and common lines positioned to represent the eyes of the various figures traced.

In testimony whereof, I have signed my name to this specification.

ANTON A. LEHR.